Feb. 12, 1957 N. B. SAUNDERS 2,781,503

MAGNETIC MEMORY CIRCUITS EMPLOYING
BIASED MAGNETIC BINARY CORES
Filed April 29, 1953

INVENTOR.
NORMAN B. SAUNDERS
BY Robert J. Palmer
Attorney 2,781,503
Patented Feb. 12, 1957

2,781,503

MAGNETIC MEMORY CIRCUITS EMPLOYING BIASED MAGNETIC BINARY CORES

Norman B. Saunders, Weston, Mass., assignor to American Machine & Foundry Company, a corporation of New Jersey Application April 29, 1953, Serial No. 351,975
4 Claims. (Cl. 340—174)

This invention relates to magnetic memory circuits and apparatus, and relates more particularly to magnetic memory circuits employing magnetic binaries.

In electronic computing circuits, shift registers used for the storage of binary information, employ magnetic binaries for handling information on a digital basis. Such magnetic binaries as used in such systems are described in an article entitled "Static magnetic storage and delay line" published in the January 1950 issue of the Journal of Applied Physics. Shift registers employing magnetic binaries are usually referred to as "magnetic binary shift registers," and will be so referred to in the following.

A magnetic binary core in a magnetic binary circuit is capable of being magnetized to saturation in either of two directions. After such magnetization, the remanent flux in the core has the maximum possible value in either direction, and this maximum value is referred to as the retentivity of the core. Two states are said to arise from the two directions: a positive or active state in which the direction of retentivity is opposite to that which would result from the application of a sensing or shift pulse to a winding on the core, and a negative or inactive state in which the direction of retentivity is the same as that which would result from the application of a shift pulse. When applied to a core in the active state, a shift current pulse causes the inactive state to appear. When applied to a core already in the inactive state, a shift pulse causes no change in state.

A current pulse applied to a winding in such a manner as to create a magnetomotive force opposite in direction to that created by the shift pulse, will cause the active state to appear, or if already present, to be maintained. Because of the property of saturation displayed by the cores, the two states are stable and reproducible.

In digital work, a core in the active or positive state is said to contain or store a binary digit "one," and a core in the negative or inactive state is said to contain the digit "zero." A "one" signal is the voltage induced by a change in core state caused by a shift pulse. A "zero" signal is the relatively small parasitic voltage occurring when there is no change of state caused by a shift pulse. A single bit of information is called a "baud."

This invention magnetically biases a magnetic binary core so that a signal pulse applied to a winding on the core is opposed by a high impedance if of one polarity, and by a low impedance if of the opposite polarity. After the signal pulse is terminated the core is returned to its biased condition. Such a biased core can be used as a unilateral coupling device between adjacent cores, as a self re-setting gate, as a baud comparison standard, for determining the polarity of a pulse, or for rendering a shift register reversible.

Such a biased core has some characteristics similar to those of a vacuum tube biased beyond cut-off since it responds only to a single direction of impressed magnetomotive force. Unlike the vacuum tube, however, which produces output pulses in one-to-one correspondence with its input pulses, a biased core generates a positive and a negative voltage pair spaced by the duration of a shift pulse, since during a shift pulse a voltage of one polarity is induced in an output winding, and after a shift pulse, the core is returned to its biased condition, and in so returning generates a voltage of the opposite polarity in the output winding.

An object of this invention is to magnetically bias a binary core so that a signal current pulse applied to a winding on the core, is opposed by a high impedance if of one polarity and by a low impedance if of the opposite polarity.

Another object of this invention is to provide a binary core having a core section magnetically biased to saturation in one direction.

Another object of this invention is to provide a binary core having two core sections, with means for magnetically biasing one of the sections to saturation in one direction.

Another object of this invention is to provide a binary core with two core sections, and to provide reversible means for magnetically biasing one of the sections to saturation in either of two directions.

Another object of this invention is to provide a self resetting gate for blocking a voltage pulse having the wrong polarity.

Another object of this invention is to use a magnetically biased core as a unilateral coupling device between adjacent binaries of a magnetic memory circuit.

Another object of this invention is to use magnetically biased binary cores as unilateral coupling devices in a magnetic binary shift register, and to reverse the direction of bias for reversing the direction of operation of the shift register.

Another object of this invention is to provide a reversible magnetic binary shift register.

This invention will now be described with reference to the drawings, of which:

Figures 1, 2, 3, 4, 5:
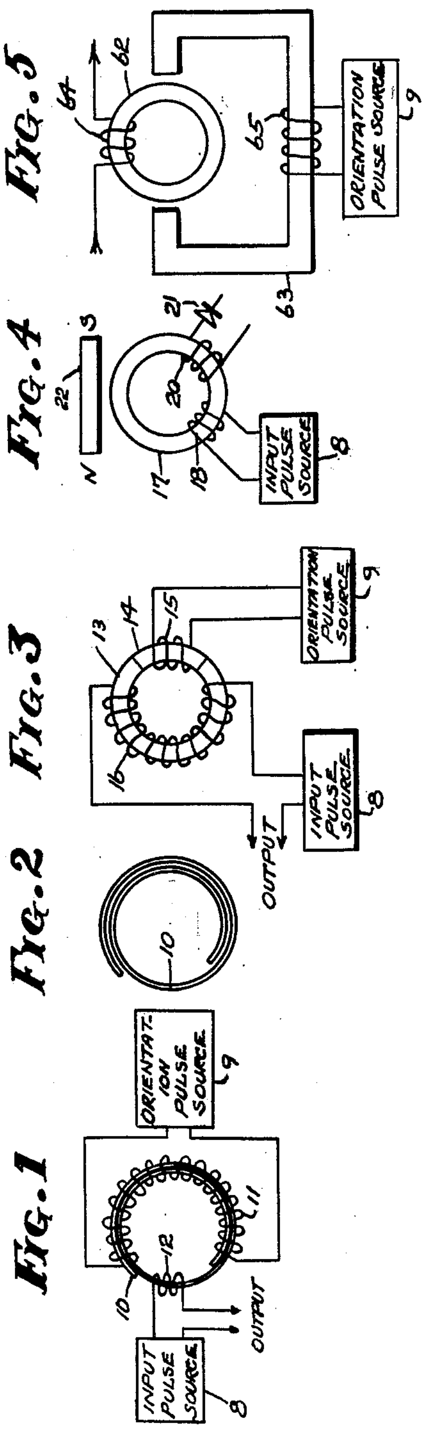
Fig. 1 is a diagrammatic view of a magnetically biased core embodying this invention.
Fig. 2 is a view of the core of Fig. 1 partially unwrapped.
Fig. 3 is a diagrammatic view of another form of magnetically biased core embodying this invention.
Fig. 4 is a diagrammatic view of another embodiment of this invention in which a magnetic binary core is biased by being placed within the field of a permanent magnet.
Fig. 5 is a diagrammatic view of another embodiment of this invention in which one core is used to magnetize another core.

Referring first to Figs. 1 and 2 of the drawings, the magnetic binary core 10 may, for example, be wound from thin strips of "Delta-Max" manufactured by the Allegheny Ludlum Steel Corporation, and having the characteristics described in the foregoing. It is so formed that it has a two wrap section on which the controlling winding 11 is wound and has a single wrap section on which the controlled winding 12 is wound. An orientation pulse from the source 9 is applied to the controlling winding 11. This pulse is sufficient to saturate both sections of the core. Subsequent pulses applied from the source 8 to the controlled winding 12 will sense a high or low impedance depending upon whether its polarity is such as to reverse or maintain respectively, the flux in the single wrap section caused by the residual magnetomotive force in the two wrap section. The energy stored in the two wrap section is sufficient to reset the single wrap section after each pulse in the controlled winding. The polarities for high and low impedance are reversed by applying an orientation pulse of the opposite polarity from the source 9 to the controlling winding 10. The single wrap section may be considered as a core for the controlled winding.

In the core of Fig. 3, a sector 14 of material having a high coercive force such, for example, as silicon steel, is inserted in a core such as one of Delta-Max which has a low coercive force. A controlling winding 15 is wound around the sector 14, and a controlled winding 16 is wound around the remainder of the core. An orientation pulse is applied from the source 9 to the winding 15 and magnetizes both sections of the core. Pulses applied from the source 8 to the winding 16 will sense a high impedance if of one polarity and a low impedance if of the opposite polarity as in the case of Fig. 2. If an orientation pulse of the opposite polarity is applied to the winding 15, the polarity of retentivity in the core section 14 will be reversed. Subsequent pulses applied to the controlled winding 16 will now sense a low impedance if of the first polarity, and a high impedance if of the other polarity. The core portion on which the controlled winding is wound may be considered as the core for that winding.

Referring now to Fig. 4 of the drawings, the core 17 which may be of Delta-Max, has an input winding 18 connected to a signal source 8, and has an output winding 20 connected through the diode 21 to output connections. Adjacent the core 17 but opposite to the portion of the core on which the windings 18 and 20 are placed so as not to affect the windings directly, is a permanent magnet 22 which saturates the core in one direction. A pulse of one polarity applied from the source 8 to the input winding 18 will saturate the core in the opposite direction so that a large read-out voltage will be induced across the output winding 20. After the pulse the core will be returned by the magnet to its original condition of saturation and at this time a read-out voltage of the opposite polarity will be induced across the output winding 20. The diode 21 will prevent this voltage from appearing at the output connections unless the voltage is to be used, in which case the diode would be omitted. A pulse from the source 8 of the opposite polarity will have no effect upon the core since it is saturated at this time in the direction the pulse would tend to saturate it, and no shift will take place and no voltage, except perhaps a small parasitic "zero" voltage, will be induced across the output winding.

Referring now to Fig. 5 of the drawings, the closed core 62 is placed between the poles of the substantially U-shaped core 63. Both cores may be of Delta-Max since the core 63 may have more core metal than the core 62 has, or it may be of material having a higher coercive force. A signal winding 64 is wound on the core 62 opposite the core 63, and a controlling winding 65 is wound on the core 63 and is connected to the orientation pulse source 9. The impedance presented to a signal in the winding 64 is dependent on the polarity of the signal and the magnetomotive force applied to the core 62 by the core 63. If the magnetomotive force applied by the core 63 to the core 62 is zero, the coil 64 will present a high impedance to the first pulse of either polarity and a low impedance to successive pulses of the same polarity. If the magnetomotive force applied by core 63 is of one polarity and stresses core 62 to somewhat more than the coercive force, coil 64 will present a vanishingly small impedance to pulses of the appropriate polarity and a high impedance to pulses of the opposite polarity provided they are not too close together. If the magnetomotive force of core 63 is reversed by reversal of the polarity of the orientation pulse through the controlling winding 65, the effect of coil 64 on signals will be reversed.

The magnetomotive force applied by core 63 to core 62 is controlled by their relative sizes, spacing and the magnetomotive force applied through winding 65. The core 63 remains in the magnetic state provided by a pulse in winding 65 until a new pulse is applied to the winding 65. The core 63 should be of such size and or have such a high coercive force or so placed relative core 62 that the magnetomotive forces produced by the signals in the winding 64 can have no appreciable effect on the core 63.

Figure 6:
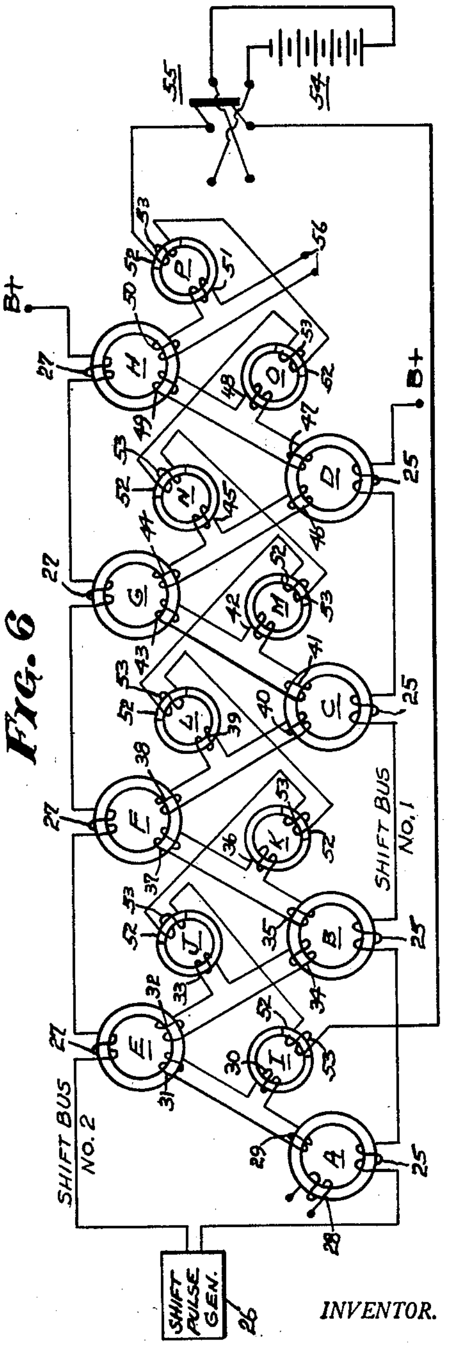
Fig. 6 is a circuit schematic of a reversible magnetic binary shift register embodying this invention.

Referring now to Fig. 6 of the drawings, the binary cores A, B, C and D form a line of storage cores of a shift register, and the similar cores E, F, G and H form a line of temporary storage cores. The cores A, B, C and D have the shift windings 25 connected to the shift bus No. 1 which is connected to a conventional shift pulse generator 26 and to B+ for the generator tubes. The cores E, F, G and H have the shift windings 27 connected to the shift pulse generator and to B+ through the shift bus No. 2.

The core A has a winding 28, and has a winding 29 connected in series with the controlled winding 30 on the biased core I, and the winding 31 on the core E. The core E has a winding 32 connected in series with the controlled winding 33 of the biased core J and the winding 34 on the core B. The core B has a winding 35 connected in series with the controlled winding 36 on the biased core K and the winding 37 on the core F. The core F has a winding 38 connected in series with the controlled winding 39 on the biased core L and the winding 40 on the core C. The core C has a winding 41 connected in series with the controlled winding 42 on the biased core M and the winding 43 on the core G. The core G has a winding 44 connected in series with the controlled winding 45 on the biased core N and the winding 46 on the core D. The core D has a winding 47 connected in series with the controlled winding 48 on the biased core O and the winding 49 on the core H. The winding H has a winding 50 connected in series with the controlled winding 51 on the biased core P and the output connections 56 which may be the connections to a winding on the next core in order when more cores are used.

The biased cores I, J, K, L, M, N, O and P may be similar to the biased core of Fig. 3 of the drawings, and may have the segments 52 of high coercive force on which the controlling windings 53 are wound. The windings 53 are connected in series with an orientation pulse source shown symbolically as a battery 54 and a double-pole, double-throw switch 55. With the switch in one closed position, current of one polarity will be supplied through the controlling windings 53, and with the switch in the other closed position, current of the opposite polarity will be supplied through the windings 53.

*Operation of Fig. 6*

Assuming that a "one" is stored in core F and that the switch 55 is closed in a direction, and the windings on the biased cores are wound in directions to cause, when the register is pulsed by the shift pulse generator, the "one" to be shifted to the left of core F, then, when a shift pulse is applied to the shift winding 27 on the core F, the flow of current caused by the voltage induced in the winding 38 of the core F will be opposed by the high impedance of the controlled winding 39 of the biased core L so that the current will be insufficient to shift the "one" into the core C. The controlled winding 36 of the biased core K would however, present a low impedance to the current caused by the voltage induced in the winding 37 of the core F so that the current flow through the winding 35 on the core B would cause the "one" to be shifted into the core B.

Next, when a shift pulse is applied to the shift winding 25 of the core B, the "one" will be shifted into the core E, the controlled winding 33 on the biased core J presenting a low impedance to the current caused by the voltage induced in the winding 34 on the core B. The controlled winding 36 on the biased core K would, however, offer a high impedance to the current caused by the voltage induced in the winding 35 on the core B so that the "one" would not be shifted back into the core F. In the same manner, the next shift pulse in the shift bus No. 1 would cause the "one" to be shifted into the core A.

When the switch 55 is closed in its other position, the polarities of the biased cores are reversed so that a "one" stored in the core F would be shifted from core F into core C, from core C into core G, and from the core G to the next core in order, when the shift register is pulsed by the shift pulse generator.

The switch 55 would, of course, be closed only momentarily in each instance for providing an orientation pulse.

When the "one" is shifted from core F into core B, the biased core L will be shifted, by the current resulting from the voltage induced in the winding 38 on the core F, towards saturation in the opposite direction to that caused by the last orientation pulse. At this time core C will not be shifted although the current resulting from the voltage induced in the winding 38, flows through its winding 40. This is for the reason that the winding 39 on the biased core L has many more turns than the winding 40 on the core C, or the core C has more core material so that the biased core L shifts at a very much lower current level than that required to shift core C. Likewise, the core B and the biased core K will shift together, the core E and the biased core J will shift together, and the core A and the biased core I will shift together.

When a shift pulse has caused a biased core to be shifted, the biased core will return to its condition of saturation caused by the last orientation pulse, as a result of the magnetic energy stored within the sector 52 of high coercive material of the core. The core is thus readied for the next information transfer.

It will have been observed that the usual diodes required in shift registers for preventing current from flowing in the wrong directions, are not used in the shift register of Fig. 6. Diodes have short lives compared to the lives of the magnetic binaries, so that replacing them by the unilateral coupling devices of this invention renders shift registers much more trouble free. Thus, even if the reversible feature of Fig. 6 is not used, there is an improvement over the conventional shift registers using diodes between cores.

The circuit drawings are diagrammatic only. The sizes and constructions of the cores, and the polarities of the coils and the directions in which they should be wound, will be apparent to one skilled in shift register circuitry.

While embodiments of the invention have been described for the purpose of illustration, it should be understood that the invention is not limited to the exact apparatus and circuits illustrated, since modifications thereof may be suggested by those skilled in the art, without departure from the essence of the invention.

What is claimed is:

1. In combination with a source of signals of opposite polarities and an output circuit, a unilateral coupling device for passing signals from said source having one polarity only to said circuit, comprising a magnetic binary core having two core segments, one of said segments being able when magnetized to saturation in one direction to magnetize the other section to saturation in the same direction, the other of said sections when magnetized to saturation in the opposite direction being unable to magnetize said one section to saturation in said opposite direction, winding means on said one section, means for supplying direct current of one polarity to said winding means for saturating said other section in said one direction, and signal input and output winding means on said other section connected to said source and said circuit.

2. The combination claimed in claim 1 in which said current supplying means is reversible for supplying direct current of the opposite polarity to said winding means on said one section.

3. A reversible shift register comprising a first binary core, a shift winding on said core, means for applying a shift pulse to said winding, first and second signal transferring windings on said core, a second binary core having a signal transferring winding thereon, a third binary core having a signal transferring winding thereon, a first coupling core having a controlled winding thereon connected in series with said first winding and said winding on said second core, a second coupling core having a controlled winding thereon connected in series with said second winding and said winding on said third core, said first and second windings and said controlled windings being so arranged that voltages induced in said first and second windings when said first core is shifted cause said controlled windings to produce opposite polarity magnetizing forces in their respective coupling cores, saturation controlling windings on said coupling cores, and reversible means for flowing direct current concurrently through said controlling windings, said coupling cores being shifted when a shift pulse is applied to said shift winding on said first core at a lower shift current than is required to shift said first, second and third cores.

4. A reversible shift register as claimed in claim 3 in which the cores have first sections of material having relatively high coercive force, and have second sections of material having relatively low coercive force, in which the controlling windings are wound on said first sections, and in which the controlled windings are wound on said second sections.

References Cited in the file of this patent

UNITED STATES PATENTS

| | | |
|---|---|---|
| 2,430,457 | Dimond | Nov. 11, 1947 |
| 2,683,819 | Rey | July 13, 1954 |

OTHER REFERENCES

Publication: RCA Review, vol. 13, issue 2, June 1952, pp. 187–190.

Thesis: M. K. Haynes, December 1950, pp. 46–50, 57–58.